form to be rendered.

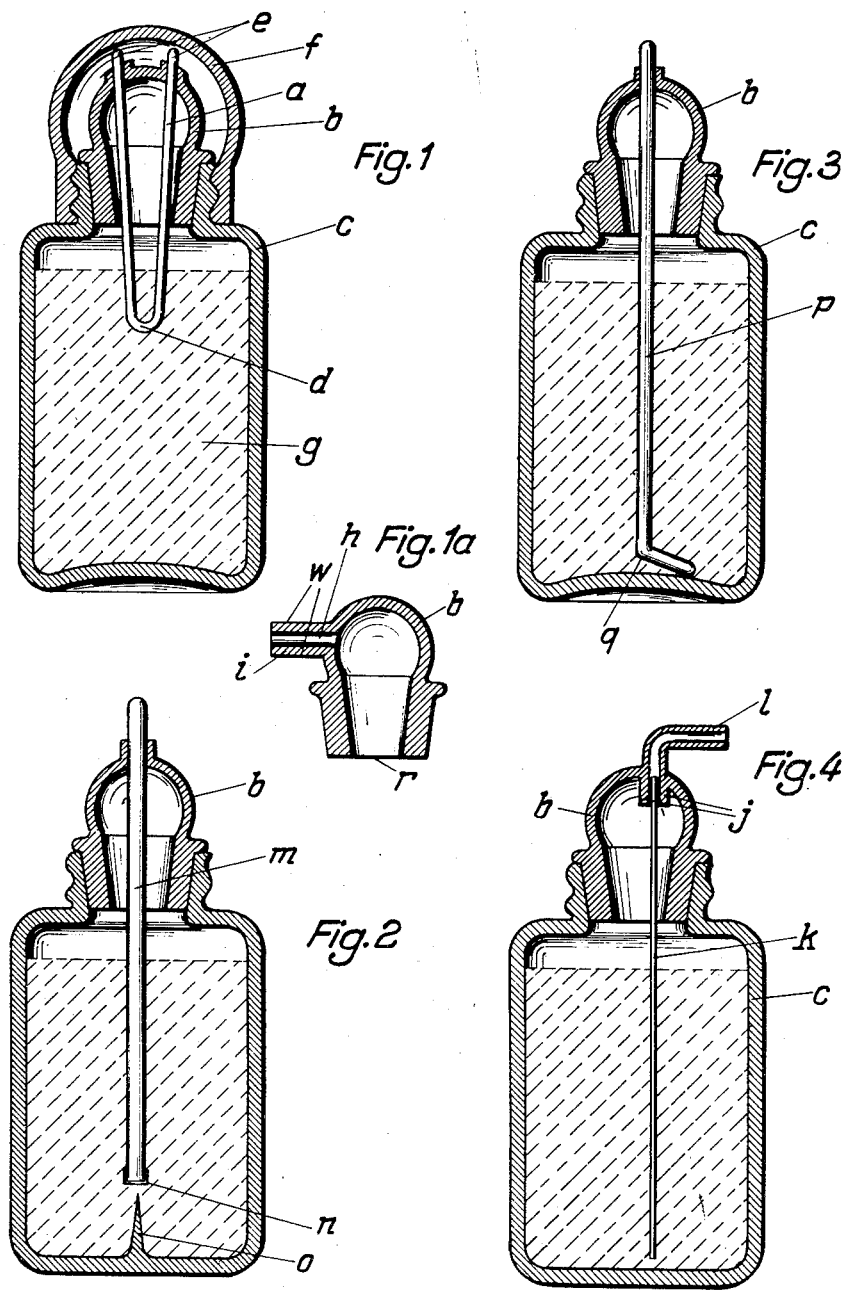

United States Patent Office 2,776,242
Patented Jan. 1, 1957

2,776,242

APPARATUS FOR PROVIDING FRESH CULTURES OF LIVING MICRO-ORGANISMS

Franz J. Geks, Brackwede, Westphalia, Germany, assignor to Asta-Werke Aktiengesellschaft Chemische Fabrik, Brackwede, Westphalia, Germany Application May 21, 1953, Serial No. 356,541

Claims priority, application Germany May 23, 1952

8 Claims. (Cl. 195—54)

The invention relates to a method of preparing fresh pure cultures of living therapeutically or commercially useful micro-organisms at the place of treatment or application, and to a device suitable for carrying out such method.

Live vaccines are used in various fields. Illustrative examples are in:

(A) Human medicine:
    (a) Vaccines of living Coli bacteria for normalizing the intestinal flora;
    (b) Vaccine of living Doderlein's vaginal bacilli for normalizing the vaginal flora;

(B) Veterinary medicine:
    (a) Vaccines of living Coli bacteria for normalizing the intestinal flora (e. g. in the case of canine distemper);
    (b) Living Bang vaccines to immunize against the contagious abortion of dairy cattle;
    (c) Red murrain vaccines for immunization against the red murrain of hogs;

(C) In the dairy industry, cultures of living micro-organisms are used in the manufacture of butter and cheese;

(D) In the fermentation industry, cultures of living micro-organisms are used in the production of wine and beer.

The therapeutic and industrial application of live vaccines was carried out heretobefore generally in such a manner that the micro-organisms were enclosed in capsules or distributed in liquids at the place of preparation and shipped in this form to the place of application. There was a more or less long period of time between the preparation and application, during which the efficiency of the micro-organisms was often considerably reduced.

It is a principal object of the invention to provide a method which makes it possible to supply vaccines of living micro-organisms in a form readily convertible into fresh highly active cultures at the place of application.

It is another object of the invention to provide apparatus suitable for carrying out said method.

Other objects and advantages will become apparent from a consideration of the specification and claims.

According to the invention, micro-organisms, which are preferably in their stationary phase and not in their growth phase, for instance freeze-dried bacteria, are enclosed at the place of preparation in a vessel, for instance a glass tube, which communicates with a larger vessel, for instance a bottle, containing a suitable culture medium; the communication is such that at the place of application the micro-organisms can be transferred into the culture medium by outside manipulation without risk of infection. A suitable apparatus comprises, for instance, a bottle containing the culture medium and provided with a resilient closure, for instance a rubber cap or cap-like rubber stopper, through which the bacteria container, e. g. a tube of glass or the like, is introduced into the bottle and preferably immersed in the culture medium; the lower part of the bacteria container can be opened by manipulation from the outside so as to allow the bacteria to enter the culture medium while maintaining the medium sealed against the atmosphere and preventing infection by the entry of air.

The invention will be described more in detail with reference to the accompanying drawings, in which Fig. 1 shows, partly in section, a device suitable for carrying out the invention;

Fig. 1a shows a modification of the rubber stopper of Fig. 1;

Figs. 2 to 4 show various other embodiments of the invention.

Referring now to Fig. 1, $a$ is a U-tube, for instance of glass, containing the bacteria which preferably were lyophilically dried. The U-tube $a$ is passed through the rubber stopper $b$ in such a way that its U-shaped lower part projects into the flask $g$ filled with culture liquor. The lower part of the U-tube $a$ has been slightly scratched at $d$ with a cutting tool, e. g. a diamond, in order to facilitate the opening at the place of application. I have found that a glass tube prepared in this manner remains leakproof but is readily cracked at the scratched circumference by slightly pressing the legs $e$ of the tube, which project through the stopper $b$, toward each other. In this embodiment of the invention it is of course necessary that the legs $e$ of the U-tube are held in the rubber stopper with sufficient resilience to allow their slight displacement toward each other without producing leaks.

The micro-organisms are transferred into the U-tube under sterile conditions. The U-tube may be sealed by closing the ends by melting. Prior to the melting, the U-tube is preferably evacuated or filled with an inert gas, for instance nitrogen. The experience has shown that freeze-dried bacteria can be kept under such conditions for a practically unlimited length of time.

By means of the described device a fresh highly active culture of bacteria can be prepared at the place of application in the simplest manner. When the legs $e$ of the U-tube are slightly forced toward each other, the lower part of the tube immersed in the culture medium is smoothly cracked off. The bacteria contained in the U-tube pass into the culture liquor and can multiply therein unimpeded. The neck of the flask $c$ is preferably provided with a closure cap $f$ of plastics or the like, which encloses and protects the hood stopper of rubber or the like as well as the parts of the device projecting therefrom, such as the ends $e$ of the U-tube and the exit tube for the bacteria culture; said cap also prevents a secondary infection of the contents of the flask during use.

The pure bacteria culture freshly prepared at the place of application can be withdrawn by means of a sponge and thus used for instance for injections.

According to a modification of the invention the closure of the flask is so arranged as to allow withdrawal of the culture liquor in portions suitable for the application, without risking infection. This can be done, for instance, by providing the rubber stopper extending beyond the upper part of the bottle neck with a preferably horizontal outlet tube of rubber or any other suitable material.

Fig. 1a illustrates such a rubber stopper b provided with a lateral outlet tube h, whose end i remains open during the sterilization of the culture broth in the bottle c; the sterilization is carried out, for instance, at a temperature of about 120° C. After the sterilization is terminated, the outlet tube is at once closed. The closure may be effected by means of a metal cap or by lead-sealing. A particularly simple closure is brought about by squeezing together the end of an outlet tube, which consists of rubber or a thermoplastic resin, by the heated jaws of a flat-jawed pliers so as to cement or weld the lumen of the tube.

The operation of the device is as follows: The culture medium is filled in the flask c, which is then closed by the rubber stopper provided with the U-tube a and the outlet tube h. Subsequently, the culture broth is sterilized, generally at about 120° C., whereby the outlet tube remains open. After the sterilization, the outlet tube h is immediately sealed at its end i. During the sterilization, the U-tube remains closed in order to protect its inner space against moisture. When the sterilization is terminated, one leg of the U-tube is opened under sterile conditions and the bacteria are introduced; then the tube is evacuated, or filled with nitrogen, and finally the opened leg of the U-tube is again sealed by fusing. In a modification of this procedure, the outlet tube h may be sealed at i and the rubber stopper b may be loosely put in the bottle during sterilization; only after sterilization, the stopper is tightly pressed into the neck of the bottle.

For use, the end of the outlet tube is preferably obliquely shorn off for opening. The plane through which the cut is to be laid is marked in Fig. 1a for instance by a bulge w. The discharge of the culture liquor through the outlet tube h can be assisted by pinching or squeezing the hood stopper b. In this way, the pressure inside the bottle may be easily increased so as to ensure a smooth discharge of the culture liquor through the outlet tube.

Though I have found that on opening the lower part of the U-tube according to Fig. 1, or the glass tube of Fig. 3, no harmful formation of splinters takes place, a filter may be provided in the outlet tube h for the fresh bacteria culture, which filter ensures the retention of glass splinters, glass powder, and the like. Such a filter, which may consist for instance of a porous fibrous material, is shown in Fig. 1a at r. In this embodiment, the filter r partitions off the lower part of the hood stopper from the upper part.

When I use an outlet tube opened as described hereinabove, specific provisions for sealing the same are not necessary. The horizontal position of the tube, the angle of the opening cut and the protective cap f prevent the access of impurities from the air. As a precaution, the outlet tube of rubber or the like may be closed, after the discharge, by means of a small clamp so as to effectively exclude any risk of infection.

In the modification of Fig. 2, a straight glass tube m, which serves as the container for the bacteria, is passed through the rubber stopper b and deeply immersed into the culture medium. The lower end of the glass tube m is closed at n, for instance by a shrunk cap. The upper end of the glass tube m, after it has received the bacteria, may be sealed in the manner described hereinabove, for instance by fusing. A spike o is provided at the bottom of the flask. When the glass tube m is pushed straight downwardly from the outside, the spike o punctures the cap n. When the tube m is pulled up again, the bacteria can enter through the formed aperture into the culture liquor and multiply therein.

Fig. 3 shows an embodiment of the invention in which the lower end of the glass tube p, which passes through the rubber stopper b is bent off at an obtuse angle. At the vertex q of the obtuse angle, I produce by scratching with a cutting tool a tension ring, which effects a smooth snapping off of the bent end of the glass tube when the tube is pressed downwardly against the bottom of the flask.

In the modifications of the apparatus described hereinabove, the culture grown at the place of application is withdrawn through the outlet tube by inclining the bottle and by increasing the inside pressure. It is, however, also possible to withdraw the desired liquid volumes only by increasing the pressure in the bottle without tilting.

An embodiment showing such apparatus is represented in Fig. 4. As will be noted, the rubber stopper b is provided at its upper part with a rubber sleeve j, through which a thin glass tube k is introduced in the culture liquor and serves as a standpipe therefor. The outlet tube l is closed by a clamp. If an overpressure obtains inside the bottle, it is sufficient to open the clamp at l a little bit in order to allow culture liquor to flow or drop out. Such a device for withdrawing culture liquor may be applied to the various modifications of the apparatus shown.

The method and apparatus described herein is susceptible of various modifications without departing from the scope of the invention which is hereby claimed as follows.

What I claim is:

1. An apparatus for providing fresh pure cultures of living micro-organisms at the place of application comprising a bottle for receiving a culture medium, a resiliently deformable compressible bulb stopper closing said bottle, and a U-tube for receiving micro-organisms tightly and resiliently held by said stopper, the legs of said U-tube projecting outwardly through said stopper, the U-shaped lower part of said U-tube being immersed in said culture medium and slightly scratched to facilitate breakage when said legs are bent towards each other by suitable manipulation of said stopper, whereby the micro-organisms enter the culture medium and multiply therein.

2. An apparatus for providing fresh pure cultures of living micro-organisms at the place of application comprising a bottle for receiving a culture medium, a resiliently deformable compressible bulb stopper closing said bottle, a glass tube for receiving micro-organisms slidably held in said stopper, a cap closing the lower end of said glass tube, and a spike at the bottom of said bottle for puncturing said cap on downward movement of said glass tube, whereupon the micro-organisms pass from said glass tube into said culture medium and multiply therein.

3. An apparatus for providing fresh pure cultures of living micro-organisms at the place of application comprising a bottle for receiving a culture medium, a resiliently deformable compressible bulb stopper closing said bottle, and a glass tube for receiving micro-organisms carried by said stopper, the lower end of said glass tube being bent at an obtuse angle and scratched at the vertex of said angle so as to break off on downward pressing of the glass tube against the bottom of the bottle, whereupon the micro-organisms pass from said glass tube into said culture medium and multiply therein.

4. An apparatus for providing fresh pure cultures of living micro-organisms at the place of application comprising a container for receiving a culture medium, a resiliently deformable compressible bulb stopper closing said container, a breakable tube for receiving micro-organisms in their stationary phase, said tube being tightly and resiliently held by said stopper and extending outwardly therethrough, and means breaking said tube on manipulation of said deformable stopper, whereby the micro-organisms enter the culture medium and multiply therein.

5. An apparatus as defined in claim 4, including an outlet tube carried by said deformable stopper.

6. An apparatus as defined in claim 5 wherein said outlet tube extends laterally from said hood stopper in horizontal direction.

7. An apparatus as defined in claim 4 including a filter in said hood stopper in the path of the culture medium from the bottle to said outlet tube, which filter allows passage of the culture liquor but holds back solid particles.

8. An apparatus as defined in claim 4 including a cup-shaped closure enclosing said bulb stopper and the upper part of said tube extending through said stopper.

References Cited in the file of this patent

UNITED STATES PATENTS

| | | |
|---|---|---|
| 816,850 | Herbert | Apr. 3, 1906 |
| 1,389,659 | Hollowood | Sept. 6, 1921 |
| 1,517,844 | Larson | Dec. 2, 1924 |
| 2,275,567 | Smith | Mar. 10, 1942 |
| 2,315,425 | Hill | Mar. 30, 1943 |
| 2,607,347 | Kleiner | Aug. 19, 1952 |
| 2,619,448 | Larsen | Nov. 25, 1952 |